United States Patent
Garcia-Crespo et al.

(10) Patent No.: US 10,132,170 B2
(45) Date of Patent: Nov. 20, 2018

(54) SYSTEMS AND METHOD FOR A COMPOSITE BLADE WITH FILLET TRANSITION

(71) Applicant: General Electric Company, Schenectady, NY (US)

(72) Inventors: Andres Jose Garcia-Crespo, Greenville, SC (US); Peter de Diego, Saluda, NC (US)

(73) Assignee: General Electric Company, Schenectady, NY (US)

( * ) Notice: Subject to any disclaimer, the term of this patent is extended or adjusted under 35 U.S.C. 154(b) by 878 days.

(21) Appl. No.: 13/842,639

(22) Filed: Mar. 15, 2013

(65) Prior Publication Data
US 2014/0271208 A1    Sep. 18, 2014

(51) Int. Cl.
*F01D 5/30* (2006.01)

(52) U.S. Cl.
CPC ............. *F01D 5/30* (2013.01); *F01D 5/3007* (2013.01); *F01D 5/3084* (2013.01); *F05D 2240/80* (2013.01); *F05D 2300/6033* (2013.01); *Y02T 50/672* (2013.01); *Y10T 156/10* (2015.01)

(58) Field of Classification Search
CPC ................ F01D 5/14; F01D 5/00–5/34; F01D 9/00–9/065; F05D 2300/00–2300/702
See application file for complete search history.

(56) References Cited

U.S. PATENT DOCUMENTS

| | | | |
|---|---|---|---|
| 4,789,594 A | 12/1988 | Stawski | |
| 4,966,527 A | 10/1990 | Merz | |
| 5,491,971 A | 2/1996 | Tomlinson et al. | |
| 5,577,377 A | 11/1996 | Tomlinson | |
| 6,487,863 B1 | 12/2002 | Chen et al. | |
| 7,198,472 B2 * | 4/2007 | McMillan | F01D 5/147 29/889.23 |
| 7,549,840 B2 * | 6/2009 | Subramanian | C04B 35/573 29/889.2 |
| 2002/0064456 A1 | 5/2002 | Marlin et al. | |
| 2007/0234729 A1 | 10/2007 | West et al. | |
| 2008/0220207 A1* | 9/2008 | Ravey | F01D 5/282 428/119 |
| 2010/0279072 A1 | 11/2010 | Morrison et al. | |

(Continued)

FOREIGN PATENT DOCUMENTS

| JP | S64-56902 A | 3/1989 |
|---|---|---|
| JP | H10-73002 A | 3/1998 |

(Continued)

OTHER PUBLICATIONS

U.S. Appl. No. 13/856,303, filed Apr. 3, 2013, Garcia Crespo.

(Continued)

*Primary Examiner* — Bryan Lettman
(74) *Attorney, Agent, or Firm* — Fletcher Yoder, P.C.

(57) ABSTRACT

A system includes a turbomachine blade segment including an airfoil with an exterior surface, and a platform coupled to the airfoil having a first side and a second side. The system also includes a concave fillet transition extending between the airfoil and the platform. The concave fillet transition includes one or more interface ply segments extending across the exterior surface of the airfoil and the first or the second side of the platform to form a continuous surface between the airfoil and the platform.

15 Claims, 3 Drawing Sheets

(56) References Cited

U.S. PATENT DOCUMENTS

2011/0271689 A1 11/2011 Lacy et al.
2012/0086152 A1 4/2012 McMillan

FOREIGN PATENT DOCUMENTS

JP 2011-527400 A 10/2011
JP 2012-514155 A 6/2012

OTHER PUBLICATIONS

Machine Translation and Notification of Reasons for Refusal issued in connection with corresponding JP Application No. 2014-001299 dated Oct. 31, 2017.

* cited by examiner

SYSTEMS AND METHOD FOR A COMPOSITE BLADE WITH FILLET TRANSITION

STATEMENT REGARDING FEDERALLY SPONSORED RESEARCH & DEVELOPMENT

This invention was made with Government support under grant number DE-FC26-05NT42643-ARRA awarded by the Department of Energy. The Government has certain rights in the invention.

BACKGROUND OF THE INVENTION

The subject matter disclosed herein relates to turbomachines, and more specifically, to turbomachine blades.

Turbomachines include compressors and turbines, such as gas turbines, steam turbines, jet engines, and hydro turbines. Generally, turbomachines include a rotor, which may be a shaft or drum, to support the turbomachine. Each turbomachine blade may include a blade portion and a platform or base portion. Unfortunately, the interface between the blade portion and the platform may be a sharp corner or joint that may be prone to stress concentrations. Accordingly, it may be desirable to improve the interface to reduce stress and increase the life of the turbomachine blade.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a turbomachine blade segment including an airfoil with an exterior surface, and a platform coupled to the airfoil having a first side and a second side. The system also includes a concave fillet transition extending between the airfoil and the platform. The concave fillet transition includes one or more interface ply segments extending across the exterior surface of the airfoil and the first or the second side of the platform to form a continuous surface between the airfoil and the platform.

In a second embodiment, a system includes a turbomachine blade segment having a plurality of airfoil layers, a plurality of platform layers, and one or more fillet segments. The plurality of airfoil layers are laminated to one another to form an airfoil. The plurality of platform layers are laminated to one another to form a platform, and the platform is coupled to the airfoil. The plurality of fillet segments extend across an exterior surface of the airfoil and into the plurality of platform layers such that at least one of the plurality of fillet segments is interwoven into the plurality of platform layers.

In a third embodiment, a method includes laminating a plurality of airfoil layers to form an airfoil of a turbomachine blade. The method further includes laminating a plurality of platform layers to form a platform of the turbomachine blade. The method further includes disposing a plurality of interface ply segments across a first exterior surface of the airfoil and a second exterior surface of the platform to form a concave fillet transition between the airfoil and the platform.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments include a turbomachine blade (e.g., composite blade) having a composite blade portion (e.g., airfoil), a composite platform, and a transition section between the airfoil and the platform. More specifically, in certain embodiments, the transition section includes a concave fillet transition that extends across an exterior surface of the airfoil and across the platform of the composite turbomachine blade. As discussed in detail below, the composite airfoil and the composite platform may be formed as a single piece from one or more laminated layers of a composite material (e.g., a ceramic matrix composite (CMC) material). As the layers of the composite material are assembled, one or more ply segments, which may also be formed from a CMC material, are assembled along the airfoil (e.g., along the exterior surface of the airfoil) and the platform to form the concave fillet transition. As discussed below, the concave fillet transition provides a smooth and continuous interface between the airfoil and the platform to provide additional support for the composite turbomachine blade against vibratory stress and premature wear and degradation.

In certain embodiments, the one or more ply segments (e.g., parallel ply segments) of the concave fillet transition extend from an exterior surface of the airfoil, bend at the corner where the airfoil and the platform couple, and extend across the length of an exterior surface of the platform. In other embodiments, at least one of the one or more ply segments extends from an exterior surface of the airfoil, bends at the corner where the airfoil and the platform couple, interweaves into laminated layers of the platform, and extends across the length of an interior surface of the platform. Furthermore, a filler region (e.g., a hollow region filled with a material) may be formed at the corner where the airfoil and the platform couple and in the space (e.g., void) between the concave fillet transition, the airfoil, and the platform. In certain embodiments, the filler region may be filled with ceramic fiber pieces, with ceramic fiber pieces suspended in a CMC material, chopped fiber resin, unreinforced resin, or a combination thereof.

As discussed in detail below, the concave fillet transition may be formed from one or more ply segments (e.g., parallel ply segments) to create one or more continuous layers between the airfoil and the platform. In certain embodiments, a ply sheet is segmented into ply segments (e.g., ply strips) in such a way that the ply segments abut one another but do not overlap each other when assembled on the airfoil and the platform to form the concave fillet transition. In other embodiments, the ply sheet is segmented into ply segments (e.g., ply strips) in such a way that the ply segments overlap each other to create one or more thin layers on the airfoil and the platform. Furthermore, in certain embodiments, a greater plurality of fibers is dispersed in the CMC material of the ply sheet than in the CMC material or layers used to form the airfoil and/or platform. In such embodiments, the additional fibers of the CMC material within the ply sheet forming the concave fillet transition may function to increase resistance to vibratory loads on the composite turbomachine blades.

Figure 1:
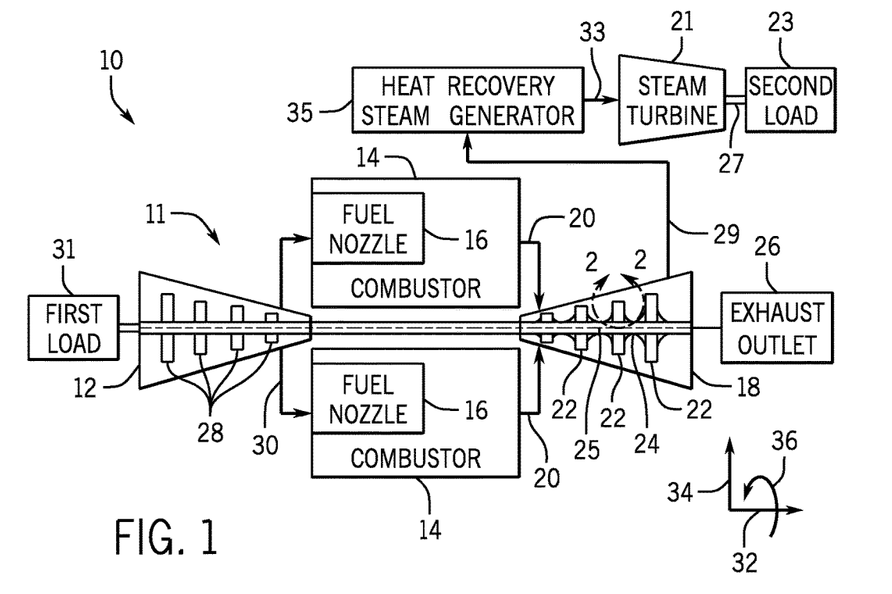
FIG. 1 is a schematic of an embodiment of a combined cycle power generation system having a gas turbine system, a steam turbine, and a heat recovery steam generation (HRSG) system.

Turning now to the drawings, FIG. 1 is a schematic block diagram of an embodiment of a combined cycle system 10 having various composite turbomachines with blade systems. In particular, the turbomachines include composite turbomachine blades (i.e., composite turbomachine blade segments), which may have a blade portion (e.g., an airfoil), a based portion with a platform and a dovetail, and one or more concave fillet transition sections bridging, coupling, and/or extending across the airfoil and the platform. Specifically, each concave fillet transition section of a composite turbomachine blade extends across an outer surface of the airfoil and across the platform to create a smooth and continuous transition between the airfoil and its respective platform.

Figure 2:
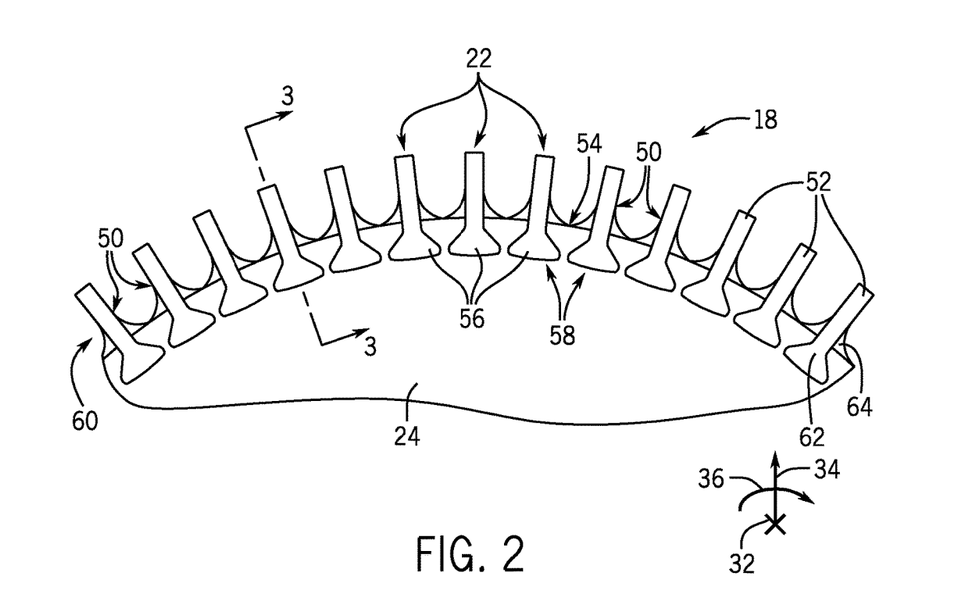
FIG. 2 is a partial cross-sectional axial view of a composite turbomachine, illustrating axially mounted composite turbomachine blades having concave fillet transitions, in accordance with embodiments of the present disclosure.

As illustrated, the combined cycle system 10 includes a gas turbine system 11 having a compressor 12, one or more combustors 14 with fuel nozzles 16, and a gas turbine 18. The fuel nozzles 16 route a liquid fuel and/or a gas fuel, such as natural gas or syngas, into the combustors 14. The combustors 14 ignite and combust a fuel-air mixture, and then pass resulting hot pressurized combustion gases 20 (e.g., exhaust) into the gas turbine 18. The gas turbine 18 includes turbine blades 22, which are coupled to a rotor 24. Each composite blade 22 includes an airfoil and a platform (as shown in FIG. 2). In particular, as discussed below, the turbine blades 22 (e.g., composite blades) include one or more concave fillet transition sections bridging the airfoil and the platform of each turbine blade 22 to create a smooth transitional interface. As the combustion gases 20 pass through the turbine blades 22 in the gas turbine 18, the gas turbine 18 is driven into rotation, which causes the rotor 24 to rotate along a rotational axis 25. Eventually, the combustion gases 20 exit the gas turbine 18 via an exhaust outlet 26 (e.g., exhaust duct, exhaust stack, silencer, etc.).

In the illustrated embodiment, the compressor 12 includes compressor blades 28 (e.g., composite blades). The compressor blades 28 within the compressor 12 are also coupled to the rotor 24, and rotate as the rotor 24 is driven into rotation by the gas turbine 18, as described above. As the compressor blades 28 rotate within the compressor 12, the compressor blades 28 compress air from an air intake into pressurized air 30, which is routed to the combustors 14, the fuel nozzles 16, and other portions of the combined cycle system 10. The fuel nozzles 16 then mix the pressurized air 30 and fuel to produce a suitable fuel-air mixture, which combusts in the combustors 14 to generate the combustion gases 20 to drive the turbine 18. Further, the rotor 24 may be coupled to a first load 31, which may be powered via rotation of the rotor 24. For example, the first load 31 may be any suitable device that may generate power via the rotational output of the combined cycle system 10, such as a power generation plant or an external mechanical load. For instance, the first load 31 may include an electrical generator, a propeller of an airplane, and so forth.

The system 10 also includes a steam turbine 21 having blades (e.g., composite blades) for driving a second load 23 (e.g., via rotation of a shaft 27). For example, the second load 23 may be an electrical generator for generating electrical power. However, both the first and second loads 31 and 23 may be other types of loads capable of being driven by the gas turbine system 11 and the steam turbine 21. In addition, although the gas turbine system 11 and the steam turbine 21 drive separate loads (e.g., first and second loads 31 and 23) in the illustrated embodiment, the gas turbine system 11 and steam turbine 23 may also be utilized in tandem to drive a single load via a single shaft.

The system 10 further includes the HRSG system 35. Heated exhaust gas 29 from the turbine 18 is transported into the HRSG system 35 to heat water to produce steam 33 used to power the steam turbine 21. As will be appreciated, the HRSG system 35 may include various economizers, condensers, evaporators, heaters, and so forth, to generate and heat the steam 33 used to power the steam turbine 21. The steam 33 produced by the HRSG system 35 passes through turbine blades of the steam turbine 21. As the steam 33 pass through the turbine blades in the steam turbine 21, the steam turbine 21 is driven into rotation, which causes the shaft 27 to rotate, thereby powering the second load 23.

In the following discussion, reference may be made to various directions or axes, such as an axial direction 32 along the axis 25, a radial direction 34 away from the axis 25, and a circumferential direction 36 around the axis 25 of the turbine 18. Additionally, as mentioned above, while the fillet transition described below may be used with any of a variety of composite turbomachine blades within turbomachines (e.g., compressors 12, gas turbines 18, or steam turbines 21) the following discussion describes improved composite turbomachines blades in the context of the turbine 18 (e.g., a gas turbine).

FIG. 2 is a partial cross-sectional axial view of an embodiment of the turbine 18 with the turbine blades 22 coupled to the rotor 24, illustrating concave fillet transitions 50 of each respective turbine blade 22. In particular, each concave fillet transition 50 bridges a blade portion (e.g., airfoil 52) of each turbine blade 22 with a platform 54 of each turbine blade 22.

Each turbine blade 22 may have a dovetail 56 (e.g., mounting segment portion or dovetail insert) configured to engage with a recess or slot 58, such as an axial or a circumferential slot. For example, the dovetail 56 may engage with a second dovetail portion or dovetail slot formed in the rotor 24. For example, in one embodiment, the slots 58 may extend in the circumferential direction 36 completely around (e.g., encircling) the rotor 24. In another embodiment, the rotor 24 may include a plurality of axial slots 58 spaced apart from one another circumferentially about the rotor 24. The illustrated embodiment shows a single stage 60 of turbine blades 22 coupled to the rotor 24. As used herein, a "stage" of turbine blades 22 refers to those turbine blades 22 extending circumferentially 36 around the rotor 24 at a certain axial 32 location along the rotor 24. Additionally, as mentioned above, the turbine blades 22 in the illustrated embodiment are axially 32 mounted (e.g., by the dovetails 56) in the dovetail slots 58. In other words, the slots 58 formed in the rotor 24 extend axially 32 along the rotor 24. As will be appreciated, the dovetail 56 of each respective turbine blade 22 may be coupled to the rotor 24 by axially 32 inserting the dovetail 56 into the slot 58.

As shown, each turbine blade 22 includes the airfoil 52, the dovetail 56, and a shank 62. Again, the airfoil 52 is the blade portion of the blade 22, while the platform 54, the dovetail 56, and the shank 62 define a base portion or mounting portion of the blade 22. Each turbine blade 22 may be formed as a single piece from multiple laminated layers (e.g., plies). Each laminated layer may be composed of a composite material, such as a ceramic matrix composite material (e.g., polymeric matrix composite), and may have a plurality of ceramic fibers embedded in a ceramic matrix. In particular, in certain embodiments, the plurality of ceramic fibers dispersed through the ceramic matrix composite material of each airfoil layer 112 (see FIG. 3) may be approximately the same. In other embodiments, the plurality of fibers dispersed through the ceramic matrix composite material of each airfoil layer 112 may vary to increase or decrease the resistance to vibratory loads on the airfoil. As will be appreciated, composite materials may be capable of withstanding higher temperatures and have greater longevities than metallic materials. Additionally, composite materials may require less cooling than metallic materials.

As discussed in detail below, the dovetail 56 of each turbine blade 22 may be configured to be disposed within the slot 58 (e.g., recess) within the rotor 24 of the turbine 18. Furthermore, the platform 54 of each turbine blade 22 may be disposed along an exterior surface of the rotor 24, and may be circumferentially 36 and/or axially 32 perpendicular to its turbine blade 22. In certain embodiments, the concave fillet transition 50 extends from an exterior surface of the airfoil 52, bends at a corner 64 where the airfoil 52 and the platform 54 couple, and extends across an exterior surface of the platform 54 to create a continuous and smooth transition between the airfoil 52 and the platform 54. In such embodiments, the concave fillet transition reinforces the corner 64 where the airfoil 52 and the platform 54 couple, and provides additional support against vibratory stress to the turbine blade 22. Furthermore, the concave fillet transition 50 provides additional protection to laminated protective coatings on the turbine blade 22 and may reduce cracking or degradation of the protective coatings that may reduce the useful life of the turbine blade 22.

Figures 3, 4:
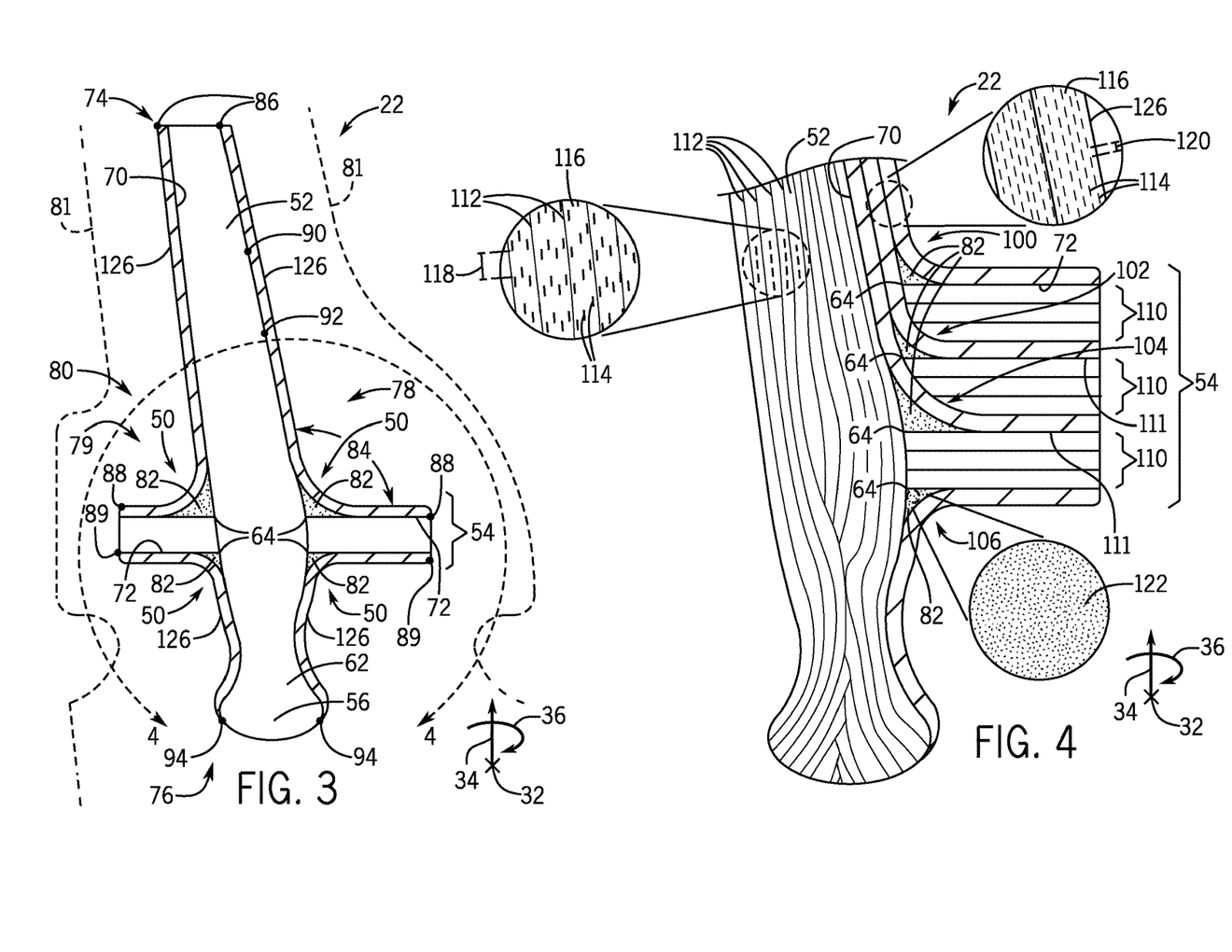
FIG. 3 is a cross-sectional circumferential view of a composite turbomachine blade having one or more concave fillet transitions, in accordance with embodiments of the present disclosure.
FIG. 4 is a partial cross-sectional circumferential view of a composite turbomachine blade having an interwoven fillet transition, in accordance with embodiments of the present disclosure.

FIG. 3 is a cross-sectional circumferential view of an embodiment of the turbine blade 22 of FIG. 2, illustrating concave fillet transitions 50 creating a smooth continuous layer between the airfoil 52 and the platform 54 of the turbine blade 22. In particular, the concave fillet transitions 50 are each formed of one or more parallel ply segments extending from an exterior surface 70 of the turbine blade 22, bending at the corner 64 where the airfoil 52 and the platform 54 couple, and extending across the length of an exterior surface 72 of the platform 54.

In the illustrated embodiment, the airfoil 52 extends to a tip 74 of the turbine blade 22 while the dovetail 56 and the shank 62 extend to a tail end 76 of the turbine blade 22. The dovetail 56 (e.g., mounting segment portion) of the turbine blade 22 may have a dovetail configuration and may be configured to be disposed within the slot 58 or recess (as shown in FIG. 2) of the rotor 24 within the turbine 18. Additionally, the platform 54 may extend laterally from the dovetail 56 on a left side 78 and on a right side 80 when the dovetail 56 is positioned within the slot 58 of the rotor 24. That is, the platform 54 may be disposed on a pressure side (i.e., right side 80) of the turbine blade 22 and on a suction side (i.e., left side 78) of the turbine blade 22.

As mentioned above, the turbine blade 22 includes the airfoil 52, the dovetail 56, and the shank 62. In addition, the turbine blade 22 includes the platform 54 coupled to the airfoil 52 to secure the turbine blade 22 in the rotor 24 and define a flow path (e.g., for combustion products 20) within the turbine 18. In certain embodiments, the turbine blades 22 are assembled within a mold structure 81 by placing a set of pre-arranged airfoil 52 ply layers in close contact with a set of pre-arranged platform 54 ply layers. In particular, the set of pre-arranged airfoil 52 ply layers may be arranged perpendicularly to the set of pre-arranged platform 54 ply layers within the mold structure 81. In certain embodiments, one or more interface ply segments 126 (e.g., interface ply strips, plurality of plies, and/or ply segments that make up the concave fillet transition 50) are arranged within the mold structure 81 to form the concave fillet transition 50. In particular, an interface ply segment 126 may extend from the tip 74 of the turbine blade 22 down towards the corner 64 and may continue across the length of the platform 54. For example, an interface ply segment 126 may be laid along an exterior surface 70 of the turbine blade 22 down towards the corner 64, and extends across the length of the platform 54 on the right side 78 or the left side 80. In other embodiments, one or more interface ply segments 126 may extend from the tail end 76 of the turbine blade 22 up towards the corner 64, and continues across the length of the platform 54 on the right side 78 or the left side 80. In certain embodiments, the fully assembled turbine blade 22 within the mold structure 81 is pressurized in an autoclave to debulk the pre-arranged laminated ply layers of the airfoil 52, the platform 54, and the concave fillet transition 50. With the debulking of the laminated ply layers, ply organic volatiles are removed and the ply layers are infiltrated with resin (e.g., molten silicon). The infiltrated layers solidify into the final turbine blade 22. In particular, the concave fillet transition 50 is incorporated into the final architecture of the turbine blade 22 to create a solid and dense transition between the airfoil 52 and the platform 54. In certain embodiments, the turbine blades 22

(including the airfoil 52, the dovetail 56, the shank 62, and the platform 54) are assembled and then secured to each other with chemical processing and/or metallurgic processing. For example, the airfoil layers 112, the platform layers 110, and the interface ply segments 126 are secured to one another with chemical processing or metallurgic processing.

In addition, in certain embodiments, a filler region 82 (i.e., a hollow region or interior corner) is defined as the space formed at the corner 64 between the concave fillet transition 50 and the airfoil 52, and/or the platform 54. In other words, the filler region 82 is the interior corner of each concave fillet transition 50. In certain embodiments, the filler region 82 may be increased or decreased in size based on the approximate degree of bend 84 of the concave fillet transition 50 at the corner 64. For example, a greater degree of bend 84 (e.g., an angle between approximately 100 degrees and 170 degrees) may result in a larger filler region 82. Likewise, a smaller degree of bend 84 (e.g., an angle between approximately 40 degrees and 80 degrees) may result in a smaller filler region 82. In other embodiments, the size of the filler region 82 may be increased or decreased based on the thickness of the ply segments forming the concave fillet transition 50. For example, a thinner ply segment may form a larger filler region 82. In yet other embodiments, the size of the filler region 82 may be based on the amount of filler material disposed within the filler region 82. The filler region 82 may be filled with ceramic fiber pieces, with ceramic fiber pieces suspended in a CMC material, chopped fiber resin, fiber reinforced plies, un-reinforced fiber resin, or a combination thereof. In particular, the concave fillet transition 50 is bent at the corner 64 to form a smooth transition over the materials disposed within the filler region 82, such that void spaces between the concave fillet transition 50 and the materials within the filler region 82 are reduced.

In the illustrated embodiment, the concave fillet transition 50 is formed of one or more ply segments 126 (e.g., ply strips) that begin at an apex point 86 on the exterior surface 70 of the turbine blade 22 at the tip 74 of the turbine blade 22. The ply segment 126 continues down towards the base 76 of the turbine blade 22, and bends at the corner 64 where the airfoil 52 is coupled to the platform 54. After bending at the corner 64, the ply segment continues to extend across the exterior surface 72 of the platform 54 before terminating at a platform edge point 88. In other embodiments, the ply segment may begin at a midline point 90 on the exterior surface 70 of the turbine blade 22, or at an airfoil base point 92 on the exterior surface 70 of the turbine blade 22. Indeed, the ply segment may also begin at any point between the apex point 86 and the base point 92. Likewise, in the illustrated embodiment, another concave fillet transition 50 begins at a terminal point 94 on the exterior surface 70 of turbine blade 22 at the base 76 of the turbine blade 22. In this embodiment, the ply segment continues up towards the tip 74 of the turbine blade 22, and bends at the corner 64 where the airfoil 52 is coupled to the platform 54. After bending at the corner 64, the ply segment continues to extend across the length of the exterior surface 72 of the platform 54 before terminating at a platform edge point 89.

In some embodiments, a layer (e.g., a single layer, or a plurality of layers) of an environmental barrier coating (EBC) 79 may be applied to surfaces of the turbine blade 22, the airfoil 52, and/or the platform 54 that are exposed to high temperature flows. In other embodiments, the EBC 79 may applied to any surface of the turbine blade 22, the airfoil 52, and/or the platform 54 having smooth transitions or continuous surfaces, such as the concave fillet transition 50. For example, the layer of the EBC 79 may be applied to the exterior surface 72 of the concave fillet transition 50, such that the EBC 79 covers the concave fillet transition 50 from, for example, the apex point 86 and/or the terminal point 94 to the platform edge point 88, 89. In some situations, the EBC 79 may protect the turbine blade 22 against recession from flowpath conditions within the system. The EBC 79 may be formed of a composite material, such as a ceramic matrix composite material (e.g., polymeric matrix composite).

FIG. 4 is a cross-sectional circumferential view of an embodiment of the turbine blade 22 of FIG. 2, illustrating one or more concave fillet transitions 50 (e.g., 100, 102, 104, and 106) interwoven into a plurality of platform layers 110. In particular, each concave fillet transition 100, 102, 104 or 106 is formed of one or more interface ply layers 126 (e.g., ply segments or ply strips), as described below in FIG. 5-6. As shown, the turbine blade 22 (including the airfoil 52, the dovetail 56, the shank 62, and the platform 54) is formed from a plurality of laminated layers or plies. For example, the airfoil 52 is formed of a plurality of airfoil layers 112 (e.g., airfoil ply layers or airfoil plies), and the platform 54 is formed of a plurality of platform layers 110 (e.g., platform ply layers or platform plies). Likewise, the concave fillet transitions 50 (e.g., 100, 102, 104, or 106) are formed of interface plies 126. In the illustrated embodiment, each concave fillet transition 50 is formed of a single non-overlapping layer of interface ply segments 126 (as further described in FIG. 5-6). In other embodiments, each concave fillet transition 50 may be formed of two, three, four, five, six, seven or more layers of interface ply segments 126. In certain embodiments, the airfoil layers 112, the platform layers 110, and the interface ply layers may be formed from a ceramic matrix material 116 having ceramic fibers 114 embedded therein. In particular, the concentration of the ceramic fibers 114 may vary between the airfoil layers 112, the platform layers 110, and the interface ply layers 126. For example, the concentration (e.g., density) of the ceramic fibers 114 within the ceramic matrix material 116 of the airfoil layers 112 and the platform layers 110 may be approximately the same. By further example, the concentration (e.g., density) of the ceramic fibers 114 within the ceramic matrix material 116 of the interface ply layers may be greater than the concentration within the airfoil layers 112 and the platform layers 110. In some embodiments, the concentration (e.g., density) of the ceramic fibers 114 within the ceramic matrix material 116 of the interface ply layers may be varied, such that the concentration within the interface ply layers may be equal to or less than the concentration within the airfoil layers 112 and the platform layers 110.

As described above, the concave fillet transition 50 may be arranged such that it is incorporated into the final architecture of the turbine blade 22 to create a solid and dense transition between the external surface 70 of the airfoil 52 and the external surface 72 of the platform 54. For example, concave fillet transitions 100 and 106 are extended across the external surface 70 of the airfoil 52 and the external surface 72 of the platform 54. In other embodiments, one or more concave fillet transitions 50 are arranged such that they are interwoven into the plurality of platform layers 110. For example, concave fillet transitions 102 and 104 are arranged on interior surfaces 111 of the platform 54. In the illustrated embodiment, each of the concave fillet transition 102 and 104 are separated by several platform layers 110. In other embodiments, one or more concave fillet transitions 102 and 104 may be adjacent to one another, and the adjacent concave fillet transitions 102 and 104 may be separated by several platform layers 110.

In certain embodiments, the turbine blade 22 (including the airfoil 52, the dovetail 56, the shank 62, and the platform 54) is formed from a plurality of laminated layers or plies. For example, the airfoil 52 of the turbine blade 22 may have 10 to 1000, 50 to 500, 100 to 400, or 200 to 300 airfoil layers 112. As mentioned above, the airfoil layers 112 may be laminated to form the airfoil 52. Likewise, the platform layers 110 may be laminated to form the platform 54, and the interface ply layers may be laminated to form the concave fillet transitions 50 (e.g., 100, 102, 104, or 106). In particular, the airfoil layers 112 are oriented lengthwise along the turbine blade 22 (e.g., in the radial 34 direction). The airfoil layers 112 and the platform layers 110 may be formed from a ceramic matrix material 116 having ceramic fibers 114 embedded therein. The ceramic matrix material 116 and the ceramic fibers 114 may be the same material or may be made from different materials. As shown, the ceramic fibers 114 are oriented within the ceramic matrix material 116 generally in the direction of the respective layer. Furthermore, the interface ply layers 126 are also formed from the ceramic matrix material 116 having ceramic fibers 114 embedded therein. In particular, the concentration of the ceramic fibers 114 may vary between the airfoil layers 112, the platform layers 110, and the interface ply layers 126. For example, in certain embodiments, a distance 118 between the ceramic fibers 114 embedded in the airfoil layers 112 may be greater than a distance 120 between ceramic fibers 114 embedded into the concave fillet transitions 50. In other embodiments, the distance 118 may be equal to or less than the distance 120. In other words, the concentration of the ceramic fibers 114 in the airfoil layers 112 or the platform layers 110 is less than the concentration of the ceramic fibers 114 in the interface ply layers of the concave fillet transitions 50.

As described above, the filler region 82 (e.g., a hollow region or interior corner) is defined as the space formed at the corner 64 between each concave fillet transition 50, the airfoil 52, and/or the platform 54. For example, in the illustrated embodiment, each concave fillet transition 50 (e.g., 100, 102, 104, or 106) is associated with the filler region 82. Each filler region 82 is in the interior corner of the respective concave fillet transition 50 (e.g., 100, 102, 104, or 106). Furthermore, each filler region 82 may be filled with ceramic fiber pieces 122. For example, the ceramic fiber pieces 122 may be ceramic fiber pieces suspended in a CMC material, chopped fiber resin, fiber reinforced plies, un-reinforced fiber resin, or a combination thereof. As described above, each concave fillet transition 50 is bent at the corner 64 to form a smooth transition over the ceramic fiber pieces 122 disposed within the filler region 82, such that void spaces between the concave fillet transition 50 and the ceramic fiber pieces 122 are reduced. In particular, the concentration of the ceramic fiber pieces 122 within the filler region 82 may be greater than the concentration of the ceramic fibers 114 within the interface ply layers, the airfoil layers 112, or the platform layers 110. In other embodiments, the concentration of the ceramic fiber pieces 122 within the filler region 82 may be equal to or less than the concentration of the ceramic fibers 114 within the interface ply layers, the airfoil layers 112, or the platform layers 110.

Figure 5:
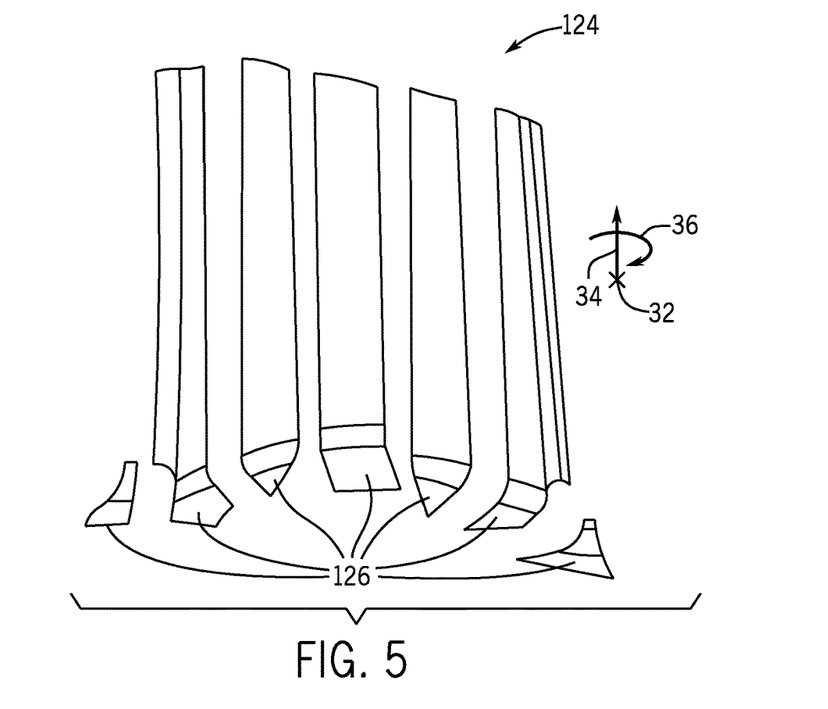
FIG. 5 is an embodiment of a segmented ply sheet, illustrating one or more interface ply segments (i.e., ply layers or ply strips)

FIG. 5 is an embodiment of a segmented ply sheet 124, illustrating one or more interface ply segments 126 (e.g., ply layers or ply strips). As described above, the concave fillet transitions 50 (e.g., 100, 102, 104, or 106) are formed of interface plies 126. In certain embodiments, each concave fillet transition 50 is formed of a single non-overlapping layer of interface ply segments 126 (as further described in FIG. 6). In other embodiments, each concave fillet transition 50 may be formed of two, three, four, five, six, seven or more layers of interface ply segments 126, such that additional layers of interface ply segments 126 provide greater support to the turbine blade 22 without compromising the structural shape of the turbine blade 22.

In the illustrated embodiment, the segmented ply sheet 124 is formed of a composite material, such as a ceramic matrix composite material (e.g., polymeric matrix composite), and may have a plurality of ceramic fibers 114 embedded in the ceramic matrix 116. In particular, in certain embodiments, the plurality of ceramic fibers 114 dispersed through the segmented ply sheet 124 may be greater than the plurality of ceramic fibers 114 dispersed through the airfoil layers 112, or the platform layers 110. In some embodiments, the plurality of ceramic fibers 114 dispersed through the segmented ply sheet 124 may be less than or equal to the plurality of ceramic fibers 114 dispersed through the airfoil layers 112, or the platform layers 110.

The illustrated embodiment of the segmented ply sheet 124 is segmented into seven interface ply segments 126. In other embodiments, the segmented ply sheet 124 may be segmented into two, three, four, five, six, eight, nine, ten, eleven, twelve, or more interface ply segments 126. In certain embodiments, each interface ply segment 126 may be a different shape or size (e.g., a wedge-shaped ply segment 126), such that the segments 126 do not overlap each other when assembled together to form the single layered concave fillet transition 50. In other embodiments, one or more of the interface ply segments 126 may be the same shape or size.

Figure 6:
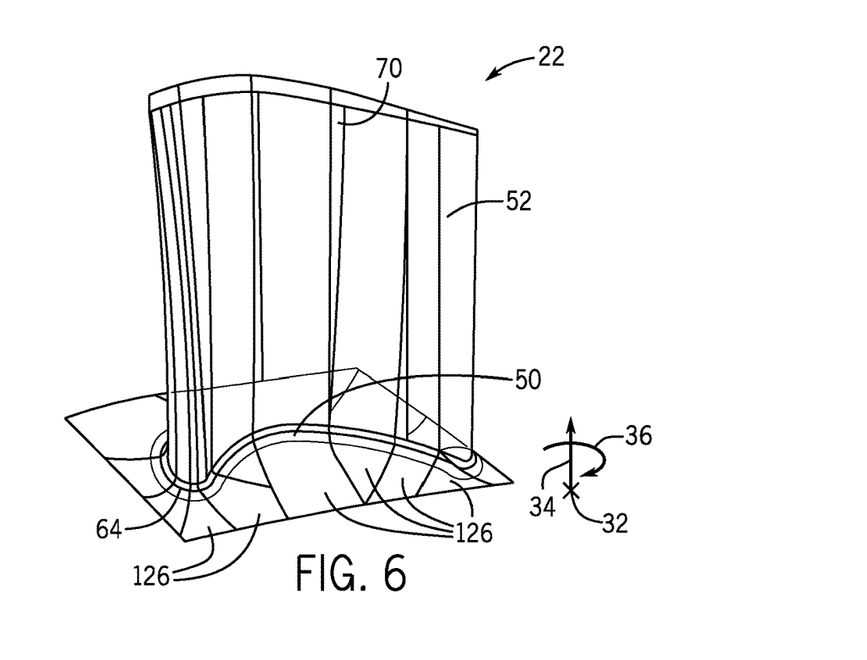
FIG. 6 is an embodiment of a composite turbomachine blade having a layer of interface ply segments, where the layer of interface ply segments form a concave fillet transition.

FIG. 6 is an embodiment of the composite turbomachine blade 22 having a layer of interface ply segments 126, where the layer of interface ply segments 126 forms the concave fillet transition 50. Specifically, in the illustrated embodiment, the interface ply segments 126 are arranged on the turbine blade 22 to form the concave fillet transition 50. As illustrated, the one or more ply segments 126 of the concave fillet transition 50 extend from the exterior surface 70 of the airfoil 52, bend at the corner 64 where the airfoil 52 and the platform 54 couple, and extend across the length of an exterior surface 72 of the platform 54. In particular, the concave fillet transition 50 provides a smooth and continuous interface between the airfoil 52 and the platform 54 to provide additional support for the composite turbomachine blade 22 against vibratory stress and premature wear and degradation.

Technical effects of the invention include the turbomachine blade 22 (e.g., composite blade) having the composite airfoil 52, the composite platform 54, and the concave fillet transition section 50 extending across and between the airfoil 52 and the platform 54. Specifically, the concave fillet transition 50 extends across the exterior surface 70 of the airfoil 52 and across the platform 54 of the composite turbomachine blade 22. The layers of the composite airfoil 52, the composite platform 54, and the concave fillet transition 50 are assembled together, and may be formed from a CMC material. Furthermore, the filler region 82 (e.g., a hollow region filled with a material) is formed at the corner 64 where the airfoil 52 and the platform 54 couple. In certain embodiments, the filler region 82 is filled with ceramic fiber pieces 122. The concave fillet transition 50 provides a smooth and continuous interface between the airfoil 52 and the platform 54 to provide additional support for the composite turbomachine blade 22 against vibratory stress and premature wear and degradation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a turbomachine blade segment, comprising:
   an airfoil;
   a platform coupled to the airfoil, the platform comprising a first side;
   a concave fillet transition extending between the airfoil and the platform on the first side, wherein an outermost surface of the turbomachine blade segment has a smooth curvature corresponding to the concave fillet transition between the airfoil and the platform; and
   an interface ply segment coupled to the airfoil and to the platform, the interface ply segment defines a first face and a second face opposite the first face, wherein a first portion of the first face couples to a first platform layer and a second portion of the second face couples to a second platform layer, and wherein the first or second face defines a corner that couples to an end surface of either the first platform layer or the second platform layer.

2. The system of claim 1, wherein the airfoil comprises a plurality of airfoil ply layers, the platform comprises a plurality of platform ply layers, and the plurality of airfoil ply layers and the plurality of platform ply layers each comprises a first plurality of ceramic fibers distributed throughout a first ceramic matrix material.

3. The system of claim 2, wherein the interface ply segment comprises a second plurality of ceramic fibers distributed throughout a second ceramic matrix material.

4. The system of claim 3, wherein a density of the second plurality of ceramic fibers varies within the second ceramic matrix material.

5. The system of claim 2, wherein the plurality of airfoil ply layers, the plurality of platform ply layers, the interface ply segment, or a combination thereof are secured to one another with at least one of a chemical bond or a metallurgic bond.

6. The system of claim 1, wherein the turbomachine blade segment comprises a filler region defined by a space between the airfoil, the platform, and the concave fillet transition.

7. The system of claim 6, wherein the filler region is filled with a plurality of ceramic fiber pieces, the plurality of ceramic fiber pieces suspended in a third ceramic matrix material, or a combination thereof.

8. The system of claim 1, wherein the concave fillet transition extends from a tip of the airfoil to an edge of the platform.

9. A system, comprising:
a turbomachine blade segment, comprising:
   a plurality of airfoil layers laminated to one another to form an airfoil;
   a plurality of platform layers laminated to one another to form a platform, wherein the platform is coupled to the airfoil;
   a first interface ply segment extending across an exterior surface of the airfoil to form a concave fillet transition between the airfoil and the platform; and
   a second interface ply segment, wherein the second interface ply segment defines a first face and a second face opposite the first face, and wherein a first portion of the first face couples to a first platform layer and a second portion of the second face couples to a second platform layer of the plurality of platform layers to couple the airfoil to the platform, and wherein the first or second face defines a corner that couples to an end surface of at least one of the platform layers.

10. The system of claim 9, wherein the plurality of airfoil layers, the plurality of platform layers, the first and second interface ply segments, or a combination thereof, comprises a plurality of ceramic fibers distributed throughout a ceramic matrix material.

11. The system of claim 9, wherein the turbomachine blade segment comprises a filler region defined by a space between the airfoil, the platform, and the concave fillet transition.

12. The system of claim 11, wherein the filler region is filled with a plurality of ceramic fiber pieces, the plurality of ceramic fiber pieces suspended in a third ceramic matrix material, or a combination thereof.

13. A system, comprising:
a turbomachine blade segment, comprising:
   an airfoil;
   a platform coupled to the airfoil, wherein the platform comprises a plurality of platform layers; and
   a concave fillet transition extending between the airfoil and the platform; and
   a plurality of interface ply layers extending between the airfoil and the platform, wherein each interface ply layer of the plurality of interface ply layers defines a first face and a second face opposite the first face, and wherein at least one interface ply layer of the plurality of interface ply layers is partially overlapped on both first and second faces by the plurality of platform layers, and wherein the first or second face of the at least one interface ply layer defines a corner that couples to at least one of the platform layers wherein an outermost surface of the turbomachine blade segment has a smooth curvature corresponding to the concave fillet transition between the airfoil and the platform.

14. The system of claim 13, wherein the plurality of interface ply layers comprises a plurality of overlapping interface ply layers, a plurality of non-overlapping interface ply layers, or a combination thereof.

15. The system of claim 13, wherein the plurality interface ply layers comprise three or more interface ply strips each extending across and between a first exterior surface of the airfoil and a second exterior surface of the platform, and the three or more interface ply strips extend across different portions of the first and second exterior surfaces.

* * * * *